(12) United States Patent
Wu et al.

(10) Patent No.: US 10,506,204 B2
(45) Date of Patent: Dec. 10, 2019

(54) STATE DETECTION AND VOICE GUIDED SETUP FOR A VIDEO DOORBELL UNIT

(71) Applicant: AT&T Digital Life, Inc., Atlanta, GA (US)

(72) Inventors: Jing Wu, Johns Creek, GA (US); Shankaran Narayanan, Alpharetta, GA (US); John Dyal, Acworth, GA (US)

(73) Assignee: AT&T Digital Life, Inc., Atlanta, GA (US)

( * ) Notice: Subject to any disclaimer, the term of this patent is extended or adjusted under 35 U.S.C. 154(b) by 350 days.

(21) Appl. No.: 15/289,673

(22) Filed: Oct. 10, 2016

(65) Prior Publication Data

US 2018/0103238 A1 Apr. 12, 2018

(51) Int. Cl.
*H04N 7/18* (2006.01)
*G08B 13/196* (2006.01)
*G08B 3/10* (2006.01)

(52) U.S. Cl.
CPC ............... *H04N 7/186* (2013.01); *G08B 3/10* (2013.01); *G08B 13/19656* (2013.01)

(58) Field of Classification Search
CPC .... H04N 7/186; G08B 3/10; G08B 13/19656; G10L 13/043
USPC ........................................................ 348/143
See application file for complete search history.

(56) References Cited

U.S. PATENT DOCUMENTS

| | | | |
|---|---|---|---|
| 6,009,153 A | 12/1999 | Houghton et al. | |
| 6,324,514 B2 | 11/2001 | Matulich et al. | |
| 7,421,390 B2 | 9/2008 | Simpson | |
| 7,464,035 B2 | 12/2008 | Funk et al. | |
| 7,801,730 B1 | 9/2010 | Miyazaki et al. | |
| 8,340,711 B1 * | 12/2012 | Glass | H04W 4/90 455/552.1 |
| 8,407,671 B2 * | 3/2013 | Ananny | G06F 11/2221 710/104 |
| 8,527,278 B2 | 9/2013 | David | |
| 8,713,119 B2 | 4/2014 | Lindahl | |
| 8,825,020 B2 | 9/2014 | Mozer et al. | |
| 8,872,915 B1 * | 10/2014 | Scalisi | H04N 7/186 348/140 |
| 8,989,731 B1 * | 3/2015 | Abou-El-Ella | H04W 76/18 455/423 |

(Continued)

FOREIGN PATENT DOCUMENTS

| | | |
|---|---|---|
| CN | 102855873 | 2/2013 |
| CN | 104036629 | 9/2014 |
| JP | 2002252884 | 6/2002 |

OTHER PUBLICATIONS

Henry, Alan, "Utter for Android Is a Personal Assistant Packed with Voice Commands, Tasker Support, and More," LifeHacker, Dec. 10, 2012, lifehacker.com.

(Continued)

*Primary Examiner* — Mohammed S Rahaman
*Assistant Examiner* — Jimmy S Lee
(74) *Attorney, Agent, or Firm* — Hartman & Citrin LLC

(57) ABSTRACT

Concepts and technologies are disclosed herein for state detection and voice guided setup for a video doorbell unit. A video doorbell unit that does not include a visual display can store prompt data that can be used to generate audio output to guide a user or other entity through a setup process using state detected by one or more state sensors of the video doorbell unit.

20 Claims, 6 Drawing Sheets

(56) References Cited

U.S. PATENT DOCUMENTS

| | | | |
|---|---|---|---|
| 9,036,224 B2* | 5/2015 | Miyagawa | H04N 1/00588 |
| | | | 358/474 |
| 9,043,210 B1 | 5/2015 | Adcock et al. | |
| 9,148,688 B2 | 9/2015 | Han et al. | |
| 9,183,843 B2 | 11/2015 | Fanty et al. | |
| 9,396,624 B2* | 7/2016 | Wilson | G08B 3/10 |
| 9,497,694 B2* | 11/2016 | Kudou | H04W 48/16 |
| 2004/0203387 A1 | 10/2004 | Grannan | |
| 2008/0037727 A1 | 2/2008 | Sivertsen et al. | |
| 2011/0273567 A1* | 11/2011 | Bhan | H04N 7/181 |
| | | | 348/159 |
| 2013/0325460 A1 | 12/2013 | Kim et al. | |
| 2014/0120901 A1 | 5/2014 | Ward et al. | |
| 2014/0188485 A1 | 7/2014 | Kim et al. | |
| 2015/0092598 A1* | 4/2015 | Kudou | H04W 48/16 |
| | | | 370/254 |
| 2015/0100321 A1 | 4/2015 | Papazian et al. | |
| 2015/0133109 A1 | 5/2015 | Freeman et al. | |
| 2015/0161856 A1* | 6/2015 | Wilson | G08B 3/10 |
| | | | 340/392.1 |
| 2015/0339334 A1* | 11/2015 | Hanke | H04L 67/306 |
| | | | 707/736 |
| 2015/0371635 A1 | 12/2015 | Kintzley et al. | |
| 2016/0155443 A1 | 6/2016 | Khan et al. | |

OTHER PUBLICATIONS

"Cutting-Edge Combo: Audio and HD Video," SENA, Apr. 30, 2015, http://www.sena.com/product/10c/.

* cited by examiner

STATE DETECTION AND VOICE GUIDED SETUP FOR A VIDEO DOORBELL UNIT

BACKGROUND

With the evolution of complex computing devices, various new computing devices are being provided in smaller packages with more powerful computing and communication capabilities. As a result, new applications for computing devices are being identified for connected home, connected car, connected business, and/or other applications and environments. For example, remotely accessible video and/or audio devices can be added to a connected home or security system environment to enable remote access to a web camera or other device for realtime monitoring of a desired location via an external network such as the Internet.

While the applications for these devices proliferate, the complexity of installing and activating these devices can present a daunting task. In particular, installation of some devices may require an intimate knowledge of the installed devices themselves, as well as an intimate knowledge of the physical and networking environments in which these devices are being installed. Thus, these devices may require installation and activation by trained personnel.

As a result, and because modern computing devices have become relatively inexpensive, the installation and activation of some devices may be more expensive than the actual devices themselves. This in turn can reduce a rate at which these devices are adopted, installed, and/or activated, as well as reduce customer satisfaction with providers of these devices.

SUMMARY

The present disclosure is directed to state detection and voice guided setup for a video doorbell unit. The concepts and technologies disclosed herein can also be used for devices other than video doorbell units. According to various embodiments of the concepts and technologies described herein, a video doorbell unit that does not include a visual display (e.g., a screen, digital display, or the like) can be added to an alarm or security system (or other connected home or office application). In some embodiments, the video doorbell unit also may not include any input device (e.g., the video doorbell unit may not include a keyboard, pointer, cursor button, or the like) other than a single doorbell button. The video doorbell unit can be configured to output audio prompts to guide a user or other entity through a setup process and to use only the doorbell button as an input device. In particular, the video doorbell unit can be configured to execute a setup program that guides a user or other entity through the setup process using only the doorbell button as an input device and by outputting the voice prompts (generated based on prompt data stored at the video doorbell unit) as output. The setup process can be conducted based on state as detected by the video doorbell unit with the onboard state sensors. Thus, the video doorbell unit can be a self-contained and self-sufficient device during setup and installation, as will be illustrated and described in more detail herein.

According to some embodiments of the concepts and technologies described herein, the video doorbell unit begins a setup process. The setup process can be initiated when connection of the power source to the video doorbell unit is sensed, either for a first time ever or for a first time after a reset of the video doorbell unit has occurred, or in response to detecting pressing of the doorbell button after the connection of the power source is detected. In some embodiments, the video doorbell unit can generate a voice prompt to a user to press the doorbell button to proceed with setup in response to detecting connection of the power source. In some embodiments, the voice prompt can also instruct a user to activate an access point (which can include one or more of an access point, a security system controller, a gateway, a router, or other access point) to which the video doorbell unit will be connected. According to some embodiments, the voice prompt instructs the user to press the doorbell button and a button on the access point, though this is not necessarily the case. The video doorbell unit can initiate a timer for a set time period. If the video doorbell unit detects selection of (e.g., by detecting a press of) the doorbell button (and in some embodiments also activation of the access point) during the time period, the setup process can proceed. If the video doorbell unit does not detect selection (e.g., pressing of) the doorbell button (and in some embodiments also activation of the access point) during the time period, the video doorbell unit can generate a failure voice prompt that indicates the failure (e.g., a failure to follow the previous instruction voice prompt). This prompt can be followed, in some embodiments, with another prompt to the user to press the doorbell button to repeat commencing setup.

Upon detecting selection of the doorbell button (and in some embodiments also activation of the access point) during the set time period, the setup process can proceed with generation of a standby prompt that instructs the user to wait. During the wait, the video doorbell unit can attempt to establish connection with the access point (which may be emitting a signal because of activation). If the video doorbell unit determines that a connection with the access point has not been established, the video doorbell unit can again generate the failure prompt, and this failure can again be followed by another prompt to the user to press the doorbell button to commence setup, if desired. If the video doorbell unit determines that a connection with the access point has been established, the video doorbell unit can generate a verification prompt that can prompt a user to verify that the connection detected by the video doorbell unit is with the correct entity (e.g., the correct access point, gateway, controller, router, or the like). If the connection is not verified, the video doorbell unit can instruct a user to reset the video doorbell unit by pressing the doorbell button and holding the doorbell button for a set period of time. The setup process can pause until the reset is detected, with additional prompts to reset the video doorbell unit being generated periodically. Upon detecting selection of the doorbell button for the set period of time, the video doorbell unit can be reset to default settings, and the setup process can return to the first operation of the setup process, namely detection of the power source as set forth above.

If the connection is verified, the setup process can proceed with the video doorbell unit generating a standby for testing prompt that can inform the user that the established connection is being tested. The video doorbell unit can then perform a signal test with the access point and determine if the connection established with the access point is acceptable in terms of signal strength, signal propagation, signal delay, other metrics (e.g., latency, error rate, noise, or other metrics), and the like. If the video doorbell unit determines that the test has failed (or does not pass), the setup process can proceed with generation of a failed prompt and a prompt for the user to remedy a detected problem. For example, the remedy can include installation of a repeater or other device to improve the signal strength, though this is not necessarily the case. The connection can be disabled and the setup process can end. If the test is passed, the setup process can proceed with the video doorbell unit generating a pass prompt that informs the user that the video doorbell unit has been successfully setup. The video doorbell unit also can prompt the user to press the doorbell button to end the test and setup process. Upon detecting selection of the doorbell button, the setup process can end and the connection can be deactivated until the video doorbell unit is activated again during operation.

According to one aspect of the concepts and technologies disclosed herein, a device is disclosed. The device can include a processor and a memory. The memory can store computer-executable instructions that, when executed by the processor, cause the processor to perform operations. The operations can include detecting a power connection at a video doorbell unit using a state sensor of the video doorbell unit, where detecting the power connection can include detecting powering on of the video doorbell unit using the state sensor and determining a power source associated with the powering on. The operations also can include generating, based on prompt data stored at the video doorbell unit, audio output including a prompt to press a doorbell button of the video doorbell unit to initiate a setup process for the video doorbell unit, starting a timer set to a time period, determining if the doorbell button is pressed during the time period, and if a determination is made that the doorbell button is pressed during the time period, generating, based on the prompt data, a standby prompt that indicates that a connection with an access point is being set up, determining that the connection with the access point has been set up, determining if the connection with the access point is verified, if a determination is made that the connection with the access point is verified, generating a standby for testing prompt and performing a signal test on a signal associated with the connection with the access point, determining that the signal test has passed, and disabling the connection and ending the setup process for the video doorbell unit.

In some embodiments, determining if the signal test has passed can include measuring a signal strength, a delay, and a propagation associated with the signal, where the signal is transmitted between the video doorbell unit and the access point, and determining that the signal strength, the delay, and the propagation meet a defined signal strength threshold, a defined delay threshold, and a defined propagation threshold. In some embodiments, the computer-executable instructions, when executed by the processor, can cause the processor to perform operations further including in response to determining that the signal test has passed, generating, based on the prompt data, a pass prompt and a prompt to press the doorbell button to end the signal test; and determining that the doorbell button has been pressed.

In some embodiments, the prompt to press the doorbell button further can include a prompt to activate the access point. In some embodiments, the access point can include a security system controller that is located at a monitored location and the video doorbell unit can be installed at the monitored location. The connection can include a local network established between the video doorbell unit and the security system controller and the video doorbell unit does not include a visual display.

According to another aspect, a method is disclosed. The method can include detecting, by a processor of a video doorbell unit using a state sensor of the video doorbell unit, a power connection at the video doorbell unit. Detecting the power connection can include detecting powering on of the video doorbell unit using the state sensor and determining a power source associated with the powering on. The method also can include generating, by the processor and based on prompt data stored at the video doorbell unit, audio output that can include a prompt to press a doorbell button of the video doorbell unit to initiate a setup process for the video doorbell unit; starting, by the processor, a timer set to a time period; determining, by the processor, if the doorbell button is pressed during the time period; and if a determination is made that the doorbell button is pressed during the time period, generating, by the processor and based on the prompt data, a standby prompt that indicates that a connection with an access point is being set up, determining, by the processor, that the connection with the access point has been set up, determining, by the processor, if the connection with the access point is verified, if a determination is made that the connection with the access point is verified, generating a standby for testing prompt and performing a signal test on a signal associated with the connection with the access point, determining, by the processor, that the signal test has passed, and disabling, by the processor, the connection and ending the setup process for the video doorbell unit.

In some embodiments, determining if the signal test has passed can include measuring a signal strength, a delay, and a propagation associated with the signal, where the signal is transmitted between the video doorbell unit and the access point; and determining that the signal strength, the delay, and the propagation meet a defined signal strength threshold, a defined delay threshold, and a defined propagation threshold. In some embodiments, the method also can include in response to determining that the signal test has passed, generating, by the processor and based on the prompt data, a pass prompt and a prompt to press the doorbell button to end the signal test; and determining, by the processor, that the doorbell button has been pressed.

In some embodiments, the method also can include in response to a determination that the connection with the access point is not verified, resetting the video doorbell unit and returning the video doorbell unit to default settings. In some embodiments, the method can include, if a determination is made that the doorbell button is not activated during the time period, generating, by the processor and based on the prompt data, a failure prompt that indicates that the setup process has failed. In some embodiments, the prompt to press the doorbell button further can include a prompt to activate the access point. In some embodiments the access point can include a gateway device associated with a network provider.

In some embodiments, the access point can include a security system controller. In some embodiments, the access point can include a security system controller that can be located at a monitored location, where the video doorbell unit is being installed at the monitored location, and the connection can include a local network established between the video doorbell unit and the security system controller. In some embodiments, the video doorbell unit does not include a visual display.

According to yet another aspect of the concepts and technologies disclosed herein, a computer storage medium is disclosed. The computer storage medium can store computer-executable instructions that, when executed by a processor, cause the processor to perform operations. The operations can include detecting a power connection at a video doorbell unit using a state sensor of the video doorbell unit, where detecting the power connection can include detecting powering on of the video doorbell unit using the state sensor and determining a power source associated with the powering on. The operations also can include generating, based on prompt data stored at the video doorbell unit, audio output including a prompt to press a doorbell button of the video doorbell unit to initiate a setup process for the video doorbell unit, starting a timer set to a time period, determining if the doorbell button is pressed during the time period, and if a determination is made that the doorbell button is pressed during the time period, generating, based on the prompt data, a standby prompt that indicates that a connection with an access point is being set up, determining that the connection with the access point has been set up, determining if the connection with the access point is verified, if a determination is made that the connection with the access point is verified, generating a standby for testing prompt and performing a signal test on a signal associated with the connection with or to the access point, determining that the signal test has passed, and ending the setup process for the video doorbell unit.

In some embodiments, determining if the signal test has passed can include measuring a signal strength, a delay, and a propagation associated with the signal, where the signal is transmitted between the video doorbell unit and the access point, and determining that the signal strength, the delay, and the propagation meet a defined signal strength threshold, a defined delay threshold, and a defined propagation threshold. In some embodiments, the computer-executable instructions, when executed by the processor, can cause the processor to perform operations further including in response to determining that the signal test has passed, generating, based on the prompt data, a pass prompt and a prompt to press the doorbell button to end the signal test; and determining that the doorbell button has been pressed.

In some embodiments, the prompt to press the doorbell button further can include a prompt to activate the access point. In some embodiments, the access point can include a security system controller that is located at a monitored location and the video doorbell unit can be installed at the monitored location. The connection can include a local network established between the video doorbell unit and the security system controller and the video doorbell unit does not include a visual display.

Other systems, devices, methods, and/or computer program products such as computer storage media according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
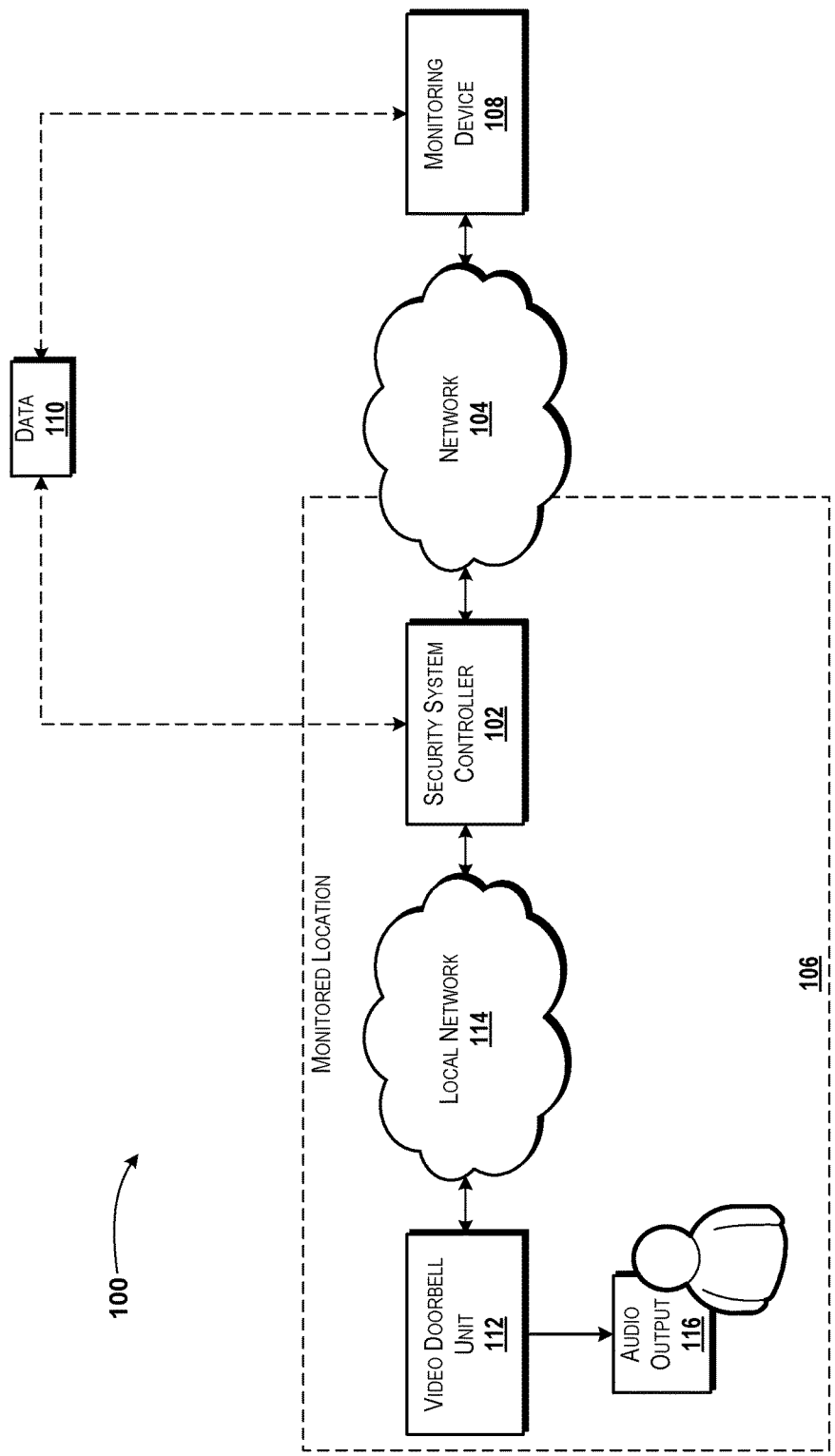
FIG. 1 is a system diagram illustrating an illustrative operating environment for various embodiments of the concepts and technologies described herein.

The following detailed description is directed to state detection and voice guided setup for a video doorbell unit. According to various embodiments of the concepts and technologies described herein, a video doorbell unit that does not include a visual display (e.g., a screen, digital display, or the like) can be added to an alarm or security system (or other connected home or office application). In some embodiments, the video doorbell unit also may not include any input device (e.g., the video doorbell unit may not include a keyboard, pointer, cursor button, or the like) other than a single doorbell button. The video doorbell unit can be configured to output audio prompts to guide a user or other entity through a setup process and to use only the doorbell button as an input device. In particular, the video doorbell unit can be configured to execute a setup program that guides a user or other entity through the setup process using only the doorbell button as an input device and by outputting only prompts (generated based on prompt data stored at the video doorbell unit) as output. The setup process can be conducted based on state as detected by the video doorbell unit by onboard state sensors. Thus, the video doorbell unit can be a self-contained and self-sufficient device during setup and installation, as will be illustrated and described in more detail herein.

According to some embodiments of the concepts and technologies described herein, the video doorbell unit begins a setup process. The setup process can be initiated when connection of the power source to the video doorbell unit is sensed, either for a first time ever or for a first time after a reset of the video doorbell unit has occurred, or in response to detecting pressing of the doorbell button after the connection of the power source is detected. In some embodiments, the video doorbell unit can generate a prompt to a user to press the doorbell button to proceed with setup in response to detecting connection of the power source. In some embodiments, the prompt can also instruct a user to activate an access point (which can include one or more of an access point, a security system controller, a gateway, a router, or other access point) to which the video doorbell unit will be connected. According to some embodiments, the prompt instructs the user to press the doorbell button and a button on the access point, though this is not necessarily the case. The video doorbell unit can initiate a timer for a set time period. If the video doorbell unit detects selection of the doorbell button (and in some embodiments also activation of the access point) during the time period, the setup process can proceed. If the video doorbell unit does not detect selection of the doorbell button (and in some embodiments also activation of the access point) during the time period, the video doorbell unit can generate a failure prompt that indicates the failure. This prompt can be followed, in some embodiments, with another prompt to the user to press the doorbell button to again commence setup.

Upon detecting selection of the doorbell button (and in some embodiments also activation of the access point) during the set time period, the setup process can proceed with generation of a standby prompt that instructs the user to wait. During the wait, the video doorbell unit can attempt to establish connection with the access point (which may be emitting a signal due to be activated). If the video doorbell unit determines that a connection with the access point has not been established, the video doorbell unit can again generate the failure prompt, and this failure can again be followed by another prompt to the user to press the doorbell button to commence setup, if desired. If the video doorbell unit determines that a connection with the access point has been established, the video doorbell unit can generate a verification prompt that can prompt a user to verify that the connection detected by the video doorbell unit is with the correct entity (e.g., the correct access point, gateway, controller, router, or the like). If the connection is not verified, the video doorbell unit can instruct a user to reset the video doorbell unit by pressing the doorbell button and holding the doorbell button for a set period of time. The setup process can pause until the reset is detected, with additional prompts to reset the video doorbell unit being generated periodically. Upon detecting selection of the doorbell button for the set period of time, the video doorbell unit can be reset to default settings, and the setup process can return to detection of the power source as set forth above.

If the connection is verified, the setup process can proceed with the video doorbell unit generating a standby for testing prompt that can inform the user that the established connection is being tested. The video doorbell unit can then perform a signal test with the access point and determine if the connection established with the access point is acceptable in terms of signal strength, signal propagation, signal delay, other metrics (e.g., latency, error rate, noise, or other metrics), and the like. If the video doorbell unit determines that the test has failed (or does not pass), the setup process can proceed with generation of a fail prompt and a prompt for the user to remedy a detected problem. For example, the remedy can include installation of a repeater or other device to improve the signal strength, though this is not necessarily the case. The connection can be disabled and the setup process can end. If the test is passed, the setup process can proceed with the video doorbell unit generating a pass prompt that informs the user that the video doorbell unit has been successfully setup. The video doorbell unit also can prompt the user to press the doorbell button to end the test and setup process. Upon detecting selection of the doorbell button, the setup process can end and the connection can be deactivated until the video doorbell unit is activated again during operation.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for state detection and voice guided setup for a video doorbell unit will be described, according to an illustrative embodiment. The operating environment 100 shown in FIG. 1 includes a security system controller 102. In some embodiments, the security system controller 102 can operate in communication with a communications network ("network") 104, though this is not necessarily the case. In some other embodiments, the security system controller 102 can operate as a part of and/or as a component of the network 104. For example, a network operator associated with the network 104 or other networks may own and control the security system controller 102. As such, it should be understood that in some embodiments, the security system controller 102 can correspond to, or can be included as part of, a home gateway; a modem; a router; a set-top box ("STB"), set-top unit ("STU"), or other customer premises equipment ("CPE"); or the like. It should be understood that these examples are illustrative and therefore should not be construed as being limiting in any way.

According to various embodiments, the functionality of the security system controller 102 may be provided by a network router; a network gateway device (e.g., a home network gateway); one or more security system logic units or control units; other computing devices; and/or other components. It should be understood that the functionality of the security system controller 102 can be provided by other computing devices such as, for example, one or more server computers, desktop computers, mobile telephones, laptop computers, STBs, STUs, or the like. It also should be understood that the functionality of the security system controller 102 can be provided by a single device, by two or more similar devices, and/or by two or more dissimilar devices. For purposes of describing the concepts and technologies disclosed herein, the security system controller 102 is described herein as an access point, router, or gateway device. Based on the above, it should be understood that this embodiment is illustrative, and should not be construed as being limiting in any way.

The security system controller 102 can execute an operating system (not illustrated in FIG. 1) and one or more application programs (not illustrated in FIG. 1) such as, for example, a setup application, one or more alarm and/or security system applications, one or more home health and/or home safety applications, one or more media applications, other applications or programs, combinations thereof, or the like. The operating system can include a computer program for controlling the operation of the security system controller 102 and the application programs can include executable programs that are configured for execution on top of the operating system to provide various functions associated with the security system controller 102. Because the various functions of some example embodiments of the security system controller 102 for providing a security or alarm service are generally understood, these functions and programs for providing these functions will not be described in additional detail herein.

The security system controller 102 can be located at an installation location at which the security system controller 102 is being installed. It can be appreciated that after installation of the security system controller 102 and/or activation of the security system controller 102, the installation location can correspond to a monitored location. Thus, the location at which the security system controller 102 is located is referred to herein and in the drawings as a monitored location 106, though it can be appreciated that until installation, the monitored location 106 can correspond to an installation location. The monitored location 106 can correspond to a home, an office, a business, an outdoor area, and/or other geographic location that can be monitored by a security system that includes and/or communicates with the security system controller 102. Thus, the monitored location 106 can be defined by walls, by geographic coordinates, by an address, combinations thereof, or the like.

The security system controller 102 can be configured to communicate with various entities. In the illustrated embodiment, the security system controller 102 can be configured to communicate with one or more monitoring devices and/or monitoring systems (hereinafter referred to as "monitoring device") 108. Thus, for example, the security system controller 102 can be configured to communicate with one or more components, devices, or systems associated with a monitoring service, a network provider, or the like. Thus, for example, the security system controller 102 can be configured to report alarms and/or other state information to an alarm monitoring company or other entity. According to various embodiments of the concepts and technologies described herein, the security system controller 102 can be configured to communicate with the monitoring device 108 via any desired protocol and/or network technologies over data connections, voice connections, and/or combinations thereof over wired and/or wireless media. It should be understood that these examples are illustrative and therefore should not be construed as being limiting in any way.

As is generally understood, the security system controller 102 can exchange data 110 with the monitoring device 108. In light of the above, it can be appreciated that the data 110 can include packet data, data streams, and/or data transmitted via voice channels and/or control channels. The data 110 can represent control instructions, status updates, alarms, alerts, combinations thereof, or the like. Because various communications between the security system controller 102 and the monitoring device 108 are generally understood, the data 110 and the communications between these devices will not be described in additional detail herein.

According to various embodiments, the security system controller 102 can communicate with various devices and/or components to accomplish monitoring of the monitored location 106. For example, the security system controller 102 can communicate with one or more shock sensors, one or more cameras, one or more door sensors, one or more window sensors, one or more smoke detectors, one or more water detection devices, one or more carbon monoxide detectors, one or more sound detection devices, one or more door lock control mechanisms, combinations thereof, or the like. According to various embodiments of the concepts and technologies disclosed herein, the security system controller 102 also can be configured to communicate with one or more video doorbell units 112.

According to various embodiments of the concepts and technologies described herein, the security system controller 102 can be configured to communicate with the video doorbell unit 112 via a local network 114. The local network 114 can correspond to a wireless connection that relies on one or more peer-to-peer protocols such as the IEEE 802.15.1 ("BLUETOOTH") protocol and/or similar peer-to-peer protocols; one or more mesh network protocols; one or more wireless networking protocols such as WiFi and WiMAX protocols; one or more cellular protocols; one or more wired connections; combinations thereof; or the like. The local network 114 also can be established using other protocols for peer-to-peer connections and/or local or wide area networks. For purposes of illustrating the concepts and technologies described herein, the local network 114 is described herein as being provided by a WiFi connection, but in light of the above, it should be understood that this example is illustrative and therefore should not be construed as being limiting in any way.

The video doorbell unit 112 can be installed to add a video doorbell function to a security system that includes or communicates with the security system controller 102. Additional details of the video doorbell unit 112 will be illustrated and described in more detail with reference to FIG. 2. Briefly, however, the video doorbell unit 112 can be configured to provide streaming video and/or images to a user of a security system. The video doorbell unit 112 also can be configured to provide and/or support one-way and two-way audio (e.g., voice) communications between a user and a person located in proximity to the video doorbell unit 112. Thus, for example, if a person rings the doorbell via the video doorbell unit 112, the user can view the person and communicate with the person via the video doorbell unit 112. Thus, the video doorbell unit 112 can generate audio output 116 for a person located at or near the video doorbell unit 112, as shown in FIG. 1. Thus, according to some embodiments of the concepts and technologies described herein, the audio output 116 can correspond to voice output associated with a user or other entity that communicates with a person at or near the video doorbell unit 112. It should be understood that this example is illustrative and therefore should not be construed as being limiting in any way.

According to various embodiments of the concepts and technologies described herein, the video doorbell unit 112 does not include a visual display such as a screen, a digital readout, a display device, or the like. During installation of the video doorbell unit 112, an installation technician or alarm system user therefore may be required to execute complex instructions to successfully complete setup of the video doorbell unit 112. Because the video doorbell unit 112 does not include a visual and/or visible display, challenges may arise during installation of the video doorbell unit 112. Embodiments of the concepts and technologies described herein support generation of voice prompts and/or other forms of audio as the audio output 116 in addition to, or instead of voice communications as described above. Additionally, the video doorbell unit 112 may be configured to detect detailed state associated with the monitored location 106 to enable guidance through the setup process (e.g., by determining that a state indicates that a prerequisite operation is completed before proceeding to a next operation).

As will be explained in more detail below, particularly with reference to FIGS. 2-3B, the audio output 116 can correspond to specific prompts to guide a user or other entity during setup of the video doorbell unit 112. Thus, the audio output 116 can reflect setup instructions, detected state, errors, combinations thereof, or the like. The audio output 116 can be followed to complete setup of the video doorbell unit 112 even though the video doorbell unit 112 does not include a visual display. These aspects of the concepts and technologies described herein will be illustrated and described in more detail below with reference to FIGS. 2-3B.

FIG. 1 illustrates one security system controller 102, one network 104, one monitored location 106, one monitoring device 108, one video doorbell unit 112, and one local network 114. It should be understood, however, that various implementations of the operating environment 100 can include zero, one, or more than one security system controller 102; zero, one, or more than one network 104; zero, one, or more than one monitored location 106; zero, one, or more than one monitoring device 108; zero, one, or more than one video doorbell unit 112; and/or zero, one, or more than one local network 114. As such, the illustrated embodiment should be understood as being illustrative, and should not be construed as being limiting in any way.

Figure 2:
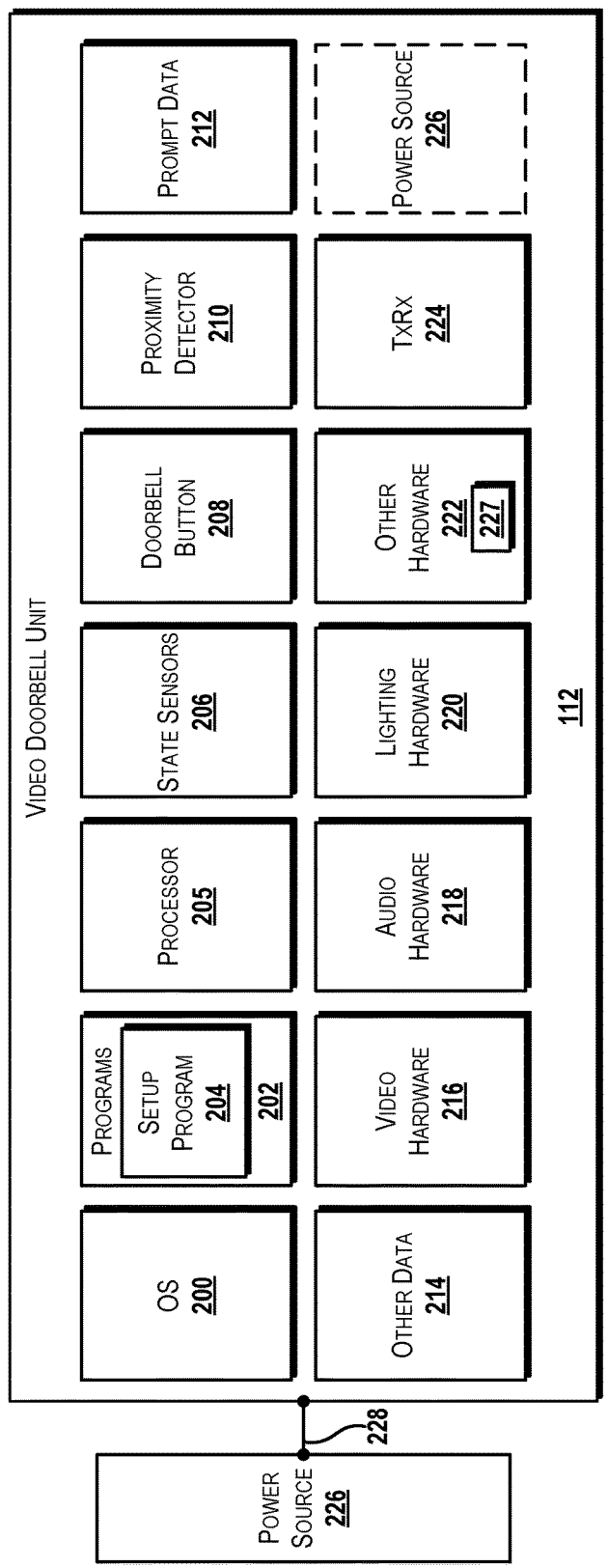
FIG. 2 is a line drawing schematically illustrating a video doorbell unit, according to some illustrative embodiments of the concepts and technologies described herein.

Turning now to FIG. 2, additional details of the video doorbell unit 112, as well as additional aspects of the concepts and technologies described herein for providing state detection and voice guided setup for a video doorbell unit 112 will be described in detail. It should be understood that the illustrated video doorbell unit 112 shown in FIG. 2 is illustrative of one contemplated embodiment of the video doorbell unit 112 and therefore should not be construed as being limiting in any way.

The video doorbell unit 112 can execute an operating system 200 and one or more application programs 202 (labeled "programs 202" in FIG. 2). The operating system 200 can include a computer program for controlling the operation of the video doorbell unit 112. The programs 202 can include executable programs that are configured for execution on top of the operating system 200 to provide various functions associated with the video doorbell unit 112 as illustrated and described herein. Thus, the programs 202 can include programs for providing streaming video and/or still images, programs for providing one-way and/or two-way audio transmission, programs for communicating doorbell activation commands or options, combinations thereof, or the like. The programs 202 also can include, in various embodiments, a setup program 204.

The setup program 204 can be executed by a processor 205 of the video doorbell unit 112 to execute a setup process as illustrated and described herein. As will be explained in more detail herein, particularly with reference to FIGS. 3A-3B, the setup program 204 can be executed to guide a user or other entity through a setup process for the video doorbell unit 112 from connection of power to, and/or powering up of, the video doorbell unit 112 through successful activation of the video doorbell unit 112 as a component of a security system that includes a security system controller 102 as shown in FIG. 1. Additional aspects of the setup process will be illustrated and described herein after introduction of the various components of the video doorbell unit 112.

The video doorbell unit 112 can include one or more state sensors 206. The state sensors 206 can include various sensors for detecting state at the video doorbell unit 112 and/or in an environment of the video doorbell unit 112. The state sensors 206 can include, for example, power sensors, which can sense the connection of power to the video doorbell unit 112 and/or identification of a power source upon connection; button sensors, which can sense activation of one or more selectors or buttons associated with the video doorbell unit 112; proximity sensors, which can sense one or more entities at or near the video doorbell unit 112; light detection sensors (e.g., photo cells, etc.), which can sense lighting conditions and/or light changes at or near the video doorbell unit 112; radio sensors, which can sense data and/or voice communications sent by and/or received by the video doorbell unit 112; other sensors; combinations thereof; or the like. These and other state sensors 206 can be used to detect progress through a setup process as will be illustrated and described in more detail herein with reference to FIGS. 2-3B in particular.

The video doorbell unit 112 also can include a switch or button ("doorbell button") 208. The doorbell button 208 of the video doorbell unit 112 can be configured to operate as a multiple function button that can provide different functions depending upon a current state associated with the video doorbell unit 112 and/or a stage of progress associated with the setup process executed by the video doorbell unit 112. Thus, as will be explained in more detail with reference to FIGS. 3A-3B below, the doorbell button 208 can be configured to activate components of the video doorbell unit 112, to deactivate components of the video doorbell unit 112, to sense state using one or more of the state sensors 206, to reset the video doorbell unit 112, to restart a setup process being performed by the video doorbell unit 112, to reset the setup program 204, combinations thereof, or the like. Additionally, the doorbell button 208 can be used to ring a doorbell after installation of the video doorbell unit 112, to enable a "push to talk" feature associated with the video doorbell unit 112, combinations thereof, or the like.

The video doorbell unit 112 also can include one or more proximity detection devices ("proximity detector") 210. The proximity detector 210 can include an infrared sensor or other type(s) of device(s) that can be configured to detect a person or other entity at or near the video doorbell unit 112. The proximity detector 210 can be used for various purposes such as, for example, to trigger welcome tones, to trigger illumination of lighting devices, to trigger activation of cameras, to trigger activation of audio devices, or the like. It should be understood that these examples are illustrative and therefore should not be construed as being limiting in any way.

The video doorbell unit 112 also can store prompt data 212. The prompt data 212 can include data that represents one or more voice prompts, as will be explained in more detail below. The prompt data 212 can include audio data and/or audio files that can correspond to one or more phrases, one or more instructions, or the like. Some example prompts that can be represented by the prompt data 212 are described below and will be explained with reference to FIGS. 3A-3B.

The video doorbell unit 112 also can include and/or store other data 214. The other data 214 can include, for example, various types of data and/or information that can be used by the video doorbell unit 112. According to various embodiments, the other data 214 can include setup information for use by the setup program 204 and/or other programs 202; user account information associated with a user or owner associated with the video doorbell unit 112; login and/or password information associated with the video doorbell unit 112; hardware and/or software profiles associated with the video doorbell unit 112; sound data such as ringtones, doorbell tones, error sounds, and/or other sounds; preferences, settings, and/or configuration information associated with the video doorbell unit 112; combinations thereof; or the like.

The video doorbell unit 112 also can include video hardware 216. The video hardware can include a camera and/or sensor (e.g., a CCID) for capturing images at or in proximity to the video doorbell unit 112. The video hardware also can include one or more housing or other structures for supporting and/or protecting the camera or sensor from various elements. It should be understood that this example is illustrative and therefore should not be construed as being limiting in any way.

The video doorbell unit 112 also can include audio hardware 218. The audio hardware 218 can include one or more speaker, one or more microphone, one or more noise cancellation device, combinations thereof, or the like. Thus, the audio hardware 218 can be used to collect audio at or near the video doorbell unit 112. The audio hardware 218 also can be used to output audio at or near the video doorbell unit 112. In some embodiments, the audio hardware 218 can support one-way and/or two-way audio communications between a user or other entity at or near the video doorbell unit 112 and a second user or other entity at a remote location. Thus, for example, the audio hardware 218 can include a speaker for outputting sound (e.g., voice prompts) at the video doorbell unit 112 as well as one or more microphone for collecting audio from the video doorbell unit 112. Because additional and/or alternative audio devices can be included as part of the audio hardware 218, it should be understood that these examples are illustrative, and should not be construed as being limiting in any way.

The video doorbell unit 112 also can include lighting hardware 220. The lighting hardware 220 can include one or more lighting devices for illuminating an area at or near the video doorbell unit 112. Thus, the lighting hardware 220 can include incandescent lighting devices, light emitting diodes, illumination panels (e.g., backlighting panels), other types of lighting devices, combinations thereof, or the like. The lighting hardware 220 also can include infrared ("IR") illumination hardware as well as IR sensing devices to enable night vision for a camera associated with the video doorbell unit 112, or the like. It should be understood that these examples are illustrative and therefore should not be construed as being limiting in any way.

The video doorbell unit 112 also can include other hardware 222. The other hardware can include a housing for the video doorbell unit 112; mounting hardware for the video doorbell unit 112; wiring for the video doorbell unit 112; and the like. The other hardware 222 also can include backup power sources (e.g., batteries, or the like), charging hardware, and the like. The other hardware 222 also can include an internal power source 227, in some embodiments. The internal power source can include one or more batteries (disposable, rechargeable, replaceable, or other types of batteries) or power sources that can be included to provide backup power (e.g., in the event of disconnection of the video doorbell unit 112 from the power source 226, power outages, etc.), to enable persistent storage of information used by the video doorbell unit 112, to start the setup process, and/or for other reasons. It should be understood that this example is illustrative, and therefore should not be construed as being limiting in any way. The other hardware 222 also can include other structures and/or components as illustrated and described herein. It should be understood that this example is illustrative and therefore should not be construed as being limiting in any way.

The video doorbell unit 112 also can include one or more receiver, transmitter, and/or transceiver ("transceiver") 224. The transceiver 224 can enable data and/or voice communications between the video doorbell unit 112 and one or more other entities such as the security system controller 102 illustrated and described herein. Thus, the transceiver 224 can be configured to communicate via one or more wired and/or wireless communications protocols. In some embodiments, the transceiver 224 can support communications using IEEE 802.11x WiFi protocols, BLUETOOTH protocols, wireless broadband communications, combinations thereof, or the like. It can be appreciated with reference to FIG. 1 that the video doorbell unit 112 may communicate with the security system controller 102 using the transceiver 224 via any desired protocol as illustrated and described herein. As such, it should be understood that the transceiver 224 can be configured in accordance with any desired protocols. The above examples therefore are illustrative and should not be construed as being limiting in any way.

The video doorbell unit 112 also can include a power source 226, which can be internal to the video doorbell unit 112 and/or connected to the video doorbell unit 112 via a power link 228. The power source 226 can include an alternating current ("AC") power source, a direct current ("DC") power source, or the like. In some embodiments, the video doorbell unit 112 can include a backup battery or other back up power source that can store a charge for use by the video doorbell unit 112 in the event of a power outage, power source failure, or the like, and this power source can be internal to the video doorbell unit 112 while an external power source such as, for example, an external battery, an external AC power source, or the like, can be connected to the video doorbell unit 112 by the power link 228. Thus, it can be appreciated that the power source 226 can include the internal power source 227 illustrated and described above. It should be understood that this example is illustrative and therefore should not be construed as being limiting in any way.

According to various embodiments of the concepts and technologies described herein, the video doorbell unit 112 may be added to an alarm or security system. As explained above, the video doorbell unit 112 does not include a visual display (e.g., a screen, digital display, or the like). As such, the video doorbell unit 112 does not have a visual display that is readable by a human and therefore is not capable of outputting setup information to a user or other entity that is installing the video doorbell unit 112. Thus, the video doorbell unit 112 can be configured to output audio prompts to guide a user or other entity through a setup procedure as illustrated and described herein. Additionally, the video doorbell unit 112 may not include an input device other than a single doorbell button 208. Thus, the video doorbell unit 112 can be configured to receive input via the doorbell button 208.

In particular, the video doorbell unit 112 can be configured to execute the setup program 204 to guide a user or other entity through the setup process using only the doorbell button 208 as an input device and by outputting only prompts (generated based on the prompt data 212) for output. Selection of the doorbell button 208 can cause the video doorbell unit 112 to perform various functions based upon a current state and/or current progress through the setup process. Additionally, selection of the doorbell button 208 after setup is complete can cause the video doorbell unit 112 to generate a doorbell tone and/or to activate the video doorbell unit 112 as is generally understood.

According to some embodiments of the concepts and technologies described herein, the video doorbell unit 112 begins a setup process when connection of the power source 226 and/or the internal power source 227 to the video doorbell unit 112 is sensed for the first time (or the first time after a reset process as illustrated and described herein). Thus, detection of the connection of the power source 226 or the internal power source 227 to the video doorbell unit 112 can commence the setup process when the video doorbell unit 112 is configured with the default settings, which can be configured when shipped or provided to a customer and/or in response to detecting a reset as illustrated and described herein. At the beginning of the setup process (e.g., in response to detecting connection of the power source 226), the video doorbell unit 112 can generate a prompt to a user to connect the video doorbell to the power source 226 via the power link 228.

In various embodiments of the concepts and technologies disclosed herein, the video doorbell unit 112 can be configured to ensure that the power source 226 complies with various requirements (e.g., operational requirements of the video doorbell unit 112, current requirements, voltage requirements, etc.) as part of the detection process. Thus, detecting connection of the power source 226 as used herein can include examining the power source 226 (or aspects of the current, voltage associated therewith) to ensure that the power source 226 complies with any and/or all requirements. It should be understood that this example is illustrative, and therefore should not be construed as being limiting in any way. Thus, it should be understood that in various embodiments, the state sensors 206 and/or other hardware 222 of the video doorbell unit 112 can include one or more sensors or other devices that can be configured to detect a voltage, current, or other aspect(s) of a power generated or supplied by the power source 226. The video doorbell unit 112 can be configured to determine if the detected aspects of the power generated or supplied by the power source 226 satisfies one or more requirements. If the external power source connected to the video doorbell unit 112 does not satisfy one or more of the requirements, a prompt can be generated to instruct a user or other entity to connect a compliant and/or correct power source 226 to the video doorbell unit 112. It should be understood that this example is illustrative, and therefore should not be construed as being limiting in any way.

In response to detecting connection of the power source 226 and/or the internal power source 227, the video doorbell unit 112 can generate a prompt to a user to press the doorbell button 208 to proceed with setup. In some embodiments, the prompt can also instruct a user to press a button on, or otherwise activate, an access point to which the video doorbell unit 112 will be connected. According to various embodiments of the concepts and technologies described herein, the prompt instructs the user to press the doorbell button 208 and a button on the security system controller 102, which acts as a gateway and access point for the alarm or security system in various embodiments. It should be understood that these examples are illustrative and therefore should not be construed as being limiting in any way.

After, before, or when issuing the prompt, the video doorbell unit 112 can initiate a timer for a set time period. The timer can specify a time during which the doorbell button 208 must be pressed and during which the access point must be activated to proceed with the setup process. In some embodiments, the timer is set for ten seconds. In some other embodiments, the timer is set for fifteen, thirty, or forty-five seconds. In yet other embodiments, the timer is set for one minute, two minutes, or more. Because the timer can be set for other time periods, it should be understood that these examples are illustrative and therefore should not be construed as being limiting in any way.

If the video doorbell unit 112 detects selection of the doorbell button 208 during the time period, the setup process can proceed. If the video doorbell unit 112 does not detect selection of the doorbell button 208 during the time period, the video doorbell unit 112 can generate a failure prompt that indicates the failure and then generate another prompt to the user to press the doorbell button 208 to commence setup. After detecting selection of the doorbell button 208 during the set time period, the setup process can proceed with generation of a standby prompt that instructs the user to wait. During the wait, the video doorbell unit 112 can attempt to establish connection with the access point (e.g., the security system controller 102).

If the video doorbell unit 112 determines that a connection with the access point has not been established, the video doorbell unit 112 can again generate a failure prompt and again generate a prompt to the user to press the doorbell button 208 to commence setup. If the video doorbell unit 112 determines that a connection with the access point has been established, the video doorbell unit 112 can generate a verification prompt that can prompt a user to verify that the connection detected by the video doorbell unit 112 is with the correct entity (e.g., the correct access point, router, gateway, security system controller 102, or the like). If the connection is not verified, the video doorbell unit 112 can instruct a user to reset the video doorbell unit 112 by pressing the doorbell button 208 and holding the doorbell button 208 for a set period of time (e.g., five seconds, ten seconds, or the like). The setup process can pause until the reset is detected, with additional prompts to reset the video doorbell unit 112 being generated periodically (e.g., every ten seconds, every thirty seconds, every minute, or the like). Upon detecting selection of the doorbell button 208 for the set period of time, the video doorbell unit 112 can be reset to default settings, and the setup process can return to detection of the power source 226 in the setup flow.

If the connection is verified, the setup process can proceed with the video doorbell unit 112 generating a standby for testing prompt that informs the user that the established connection is being tested. The video doorbell unit 112 can then perform a signal test with the access point (e.g., the security system controller 102) and determine if the connection established with the access point is acceptable in terms of signal strength, or other metrics such as latency, delay, signal propagation, connection bandwidth, noise, combinations thereof, or the like. If the video doorbell unit 112 determines that the test is failed (or does not pass), the setup process can proceed with generation of a fail prompt and a prompt for the user to remedy a detected issue. The connection can be disabled and the setup process can be ended under these circumstances.

If the test is passed successfully, the setup process can proceed with the video doorbell unit 112 generating a pass prompt that informs the user that the video doorbell unit 112 has been successfully set up. The video doorbell unit 112 also can prompt the user to press the doorbell button 208 to end the test and setup process. These prompts can be repeated periodically (e.g., every five seconds, ten seconds, thirty seconds, one minute, or the like) until selection of the doorbell button 208 is detected. Upon detecting selection of the doorbell button 208, the setup process can end and the connection can be ended until the video doorbell unit 112 is activated again during operation. Additional details regarding the setup process will be illustrated and described in more detail below with reference to FIGS. 3A-3B.

Because the video doorbell unit 112 can include additional components and/or multiple instances of some or all of the illustrated components, it should be understood that the example embodiment shown in FIG. 2 is illustrative. Therefore, the embodiment shown in FIG. 2 should not be construed as being limiting in any way.

Figure 3A:
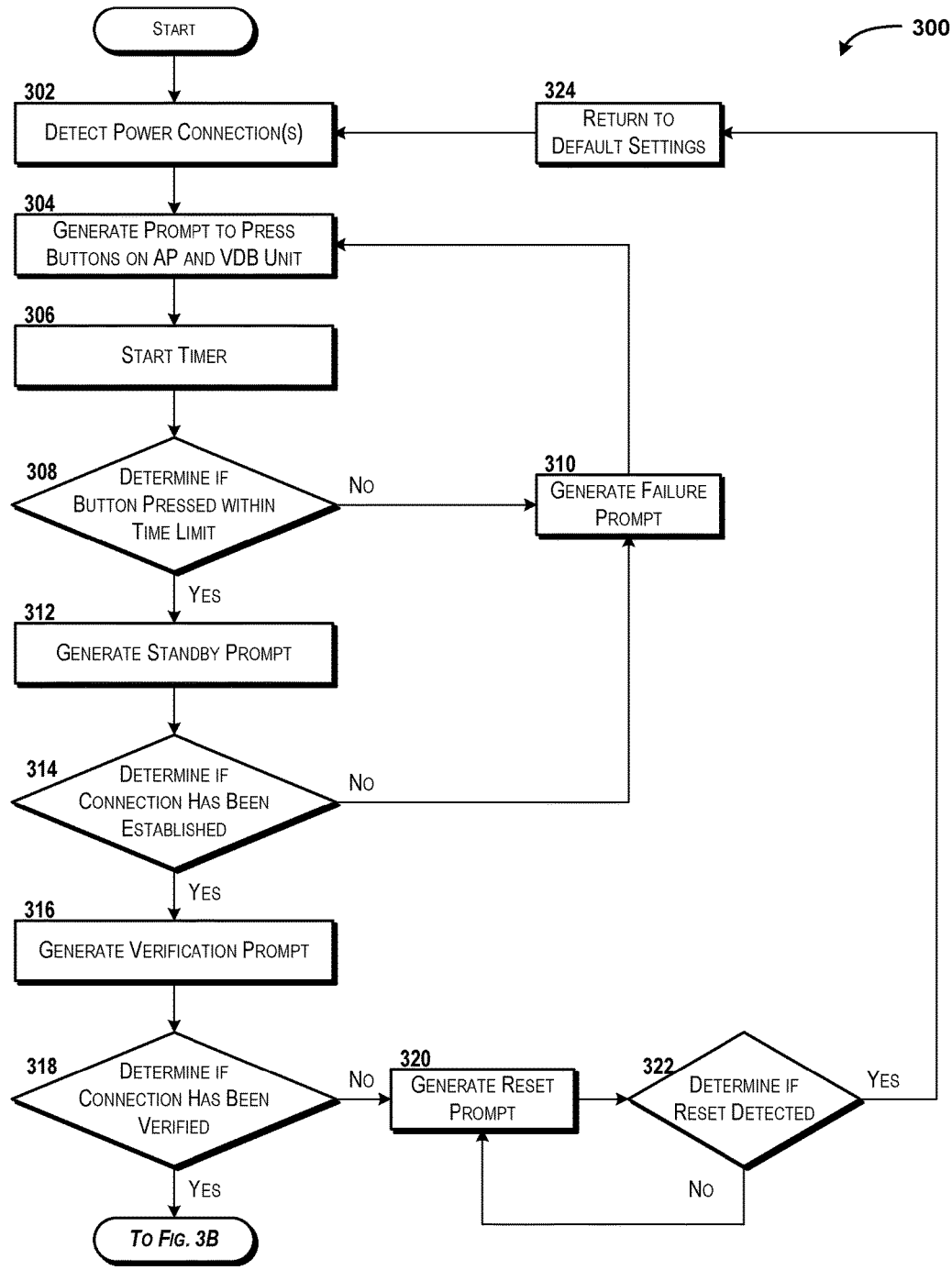
FIGS. 3A-3B are flow diagrams showing aspects of a method for setting up a video doorbell unit, according to an illustrative embodiment of the concepts and technologies described herein.
Figure 3B:
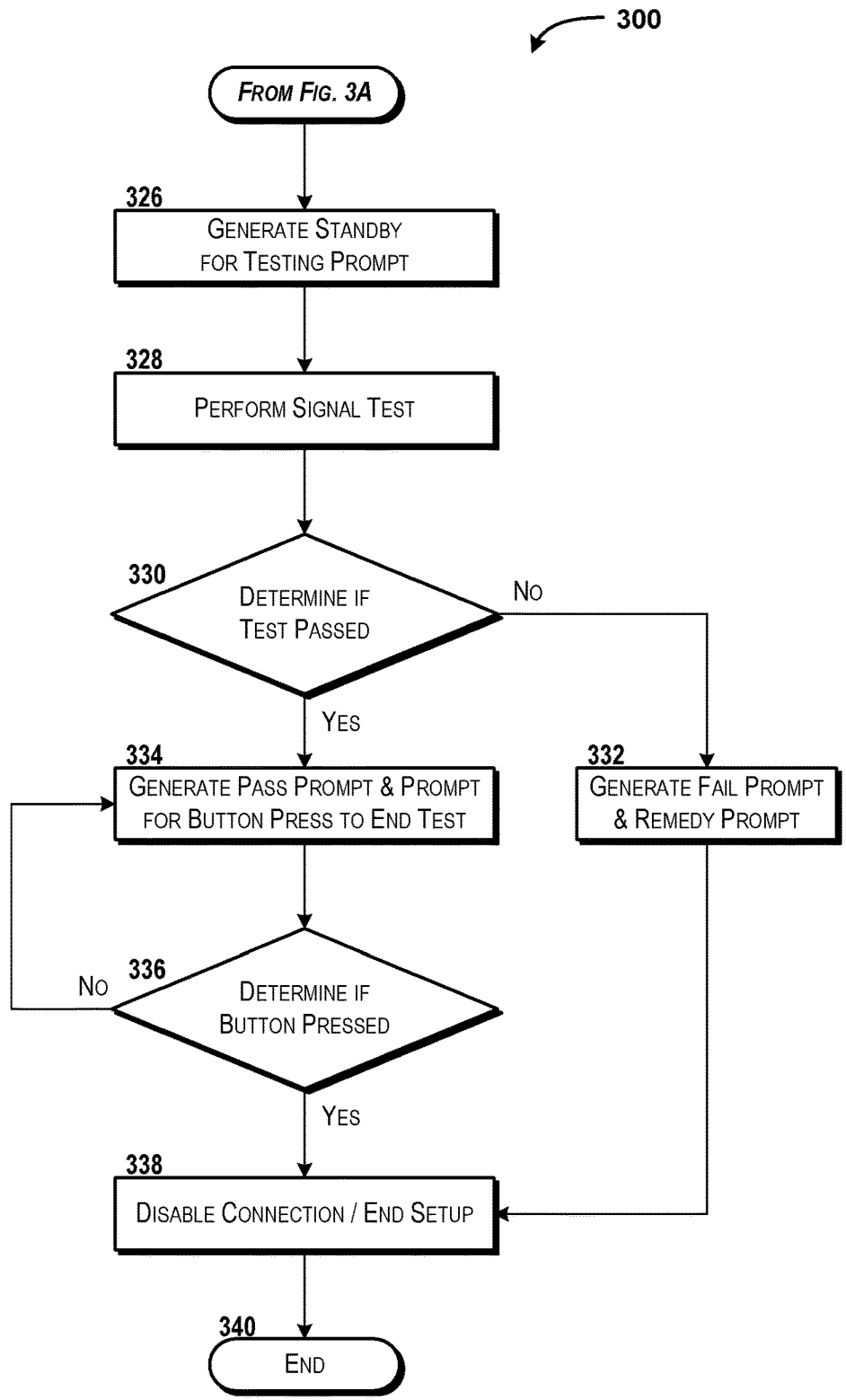

Turning now to FIGS. 3A-3B, aspects of a method 300 for setting up a video doorbell unit 112 will be described in detail, according to an illustrative embodiment. It should be understood that the operations of the method 300 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method 300 disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the video doorbell unit 112, to perform one or more operations and/or causing the processor (e.g., the processor 205) to direct other components of the computing system or device to perform one or more of the operations.

For purposes of illustrating and describing the concepts of the present disclosure, the method 300 disclosed herein is described as being performed by the video doorbell unit 112 via execution of one or more software modules such as, for example, the programs 202 and/or the setup program 204. It should be understood that additional and/or alternative devices and/or network nodes can provide the functionality described herein via execution of one or more modules, applications, and/or other software including, but not limited to, the programs 202 and the setup program 204. Thus, the illustrated embodiments are illustrative, and should not be viewed as being limiting in any way.

The method 300 begins at operation 302. At operation 302, the video doorbell unit 112 can detect a power connection. The video doorbell unit 112 can detect connection of the power source 226 to the video doorbell unit 112 in operation 302 in some embodiments, while according to some other embodiments the video doorbell unit 112 can detect the power connection by detecting powering on of the video doorbell unit 112. According to various embodiments, the video doorbell unit 112 can detect connection of the power source 226 in a variety of manners. In some embodiments, powering on of the video doorbell unit 112 can be detected by a power detection chip or other device (any or all of which can be included in the state sensors 206 illustrated and described above) installed at the video doorbell unit 112 and a power source used to power on the video doorbell unit 112 can be identified in operation 302. In some other embodiments, the video doorbell unit 112 can be configured to detect powering on of the device via execution of code (e.g., a BIOS or the like) by the video doorbell unit 112.

In some embodiments, the power source 226 can include a battery, an external power source, combinations thereof, or the like. Thus, it can be appreciated that the video doorbell unit 112 can perform operation 302 by detecting installation of a battery at the video doorbell unit 112, connection of a battery to the video doorbell unit 112, connection of an external power source to the video doorbell unit 112, determining that the connection of a correct power source to the video doorbell unit 112, combinations thereof, or the like. Thus, it also can be appreciated that the power source 226 can include a direct current source, an alternating current source, combinations thereof, or the like. Regardless of how the connection of the power source 226 is detected by the video doorbell unit 112, it can be appreciated that in operation 302, the connection of the power source 226 and/or the powering on of the video doorbell unit 112 is/are detected.

Although not separately illustrated in FIGS. 3A-3B, in some embodiments the video doorbell unit 112 can be configured to generate a voice prompt in response to detecting connection of one or more power sources (e.g., the power source 226) in operation 302. In some contemplated embodiments, the video doorbell unit 112 can generate a first prompt when detection of powering up of the video doorbell unit 112 from a battery is detected and a second prompt when detection of powering up of the video doorbell unit 112 from an external (e.g., alternating current) power source is detected. In one contemplated embodiment, the first prompt can correspond to a spoken phrase "hello, goodbye" and the second prompt can correspond to a spoken word "alert." Because other prompts are possible and are contemplated (e.g., the first prompt can correspond to a spoken phrase "battery connected, connect to AC power source" and the second prompt can correspond to a spoken phrase "AC power source connected"), it should be understood that these examples are illustrative, and should not be construed as being limiting in any way.

According to various embodiments of the concepts and technologies described herein, the video doorbell unit 112 can be shipped or otherwise provided to a customer or other entity with default settings. The default settings can specify, for example, a networking profile, a power profile, user account information, device address information, combinations thereof, or the like. Thus, the video doorbell unit 112 can be configured to apply the default settings upon powering up of the video doorbell unit 112. It should be understood that this embodiment is illustrative, and should not be construed as being limiting in any way.

From operation 302, the method 300 can proceed to operation 304. At operation 304, the video doorbell unit 112 can generate a prompt to press the doorbell button 208 on the video doorbell unit 112 and to press a button on an access point, gateway, router, controller, or other device or system (e.g., the security system controller 102) to which the video doorbell unit 112 is to connect. It can be appreciated that the access point may not have a button, per se, and that other operations and/or actions may be prompted to activate the access point and/or to put the access point (or gateway, controller, router, or other device) into a discover mode. It can be appreciated that requiring the user or other entity to activate the video doorbell unit 112 and the access point can prevent an unauthorized user from obtaining access to or obtaining information relating to the access point, though this is not necessarily the case.

According to some embodiments, the prompt generated in operation 304 can correspond to a spoken phrase "connect within x seconds," where x corresponds to any desired time threshold; a spoken phrase "press the doorbell button to begin setup;" other prompts; combinations thereof; or the like. As explained above, the prompt generated in operation 304 can be generated based on prompt data 212 stored at the video doorbell unit 112 and therefore may not require any communications with other entities, network communications, or the like. Because other prompts can be generated to prompt the user or other entity to activate the access point and to press the doorbell button 208, it should be understood that this embodiment is illustrative, and should not be construed as being limiting in any way.

From operation 304, the method 300 can proceed to operation 306. At operation 306, the video doorbell unit 112 can start a timer. The timer can be set to a specified time limit that can be set by program code, by preferences, by settings, by manufacturers, and/or by other entities. According to various embodiments of the concepts and technologies described herein, the timer can be set to five seconds, ten seconds, fifteen seconds, thirty seconds, forty-five seconds, one minute, two minutes, and/or other amounts of time. In some embodiments, the timer is set to two minutes (one hundred twenty seconds) to give the user or other entity time to walk to the access point and push a button on the access point (or take other actions to activate the access point). The timer can be used to limit a setup time for the video doorbell unit 112 so other entities cannot obtain access to the video doorbell unit 112. It should be understood that this embodiment is illustrative, and should not be construed as being limiting in any way.

From operation 306, the method 300 can proceed to operation 308. At operation 308, the video doorbell unit 112 can determine if the doorbell button 208 has been pressed within a time limit associated with the timer started in operation 306. If the video doorbell unit 112 determines, in operation 308, that the doorbell button 208 has not been pressed within the time limit, the method 300 can proceed to operation 310. At operation 310, the video doorbell unit 112 can generate a failure prompt. The failure prompt can indicate that the doorbell button 208 was not pressed or otherwise selected during the specified time limit. In some embodiments, the prompt generated in operation 310 can also indicate to a user or other entity that the setup process is being terminated and/or that the setup process is returning to an earlier operation. It should be understood that this embodiment is illustrative, and should not be construed as being limiting in any way.

According to some embodiments, the prompt generated in operation 310 can correspond to an alert tone, a spoken phrase "alert," a spoken phrase "setup failed," other spoken phrases or words, other sounds, combinations thereof, or the like. As explained above, the prompt generated in operation 310 can be generated based on prompt data 212 stored at the video doorbell unit 112 and therefore may not require any communications with other entities, network communications, or the like. Because other prompts can be generated to inform the user that the setup process has failed as detailed above (and/or that the setup process is being terminated), it should be understood that this example prompt is illustrative, and should not be construed as being limiting in any way.

From operation 310, the method 300 can return to operation 304. Upon returning to operation 304, the video doorbell unit 112 can again generate a prompt to press the doorbell button 208 on the video doorbell unit 112 and to press a button on, or take other actions to activate, the access point as illustrated and described above with reference to operation 304. It should be understood that the prompts generated in operations 310 and 304 can be presented as one continuous prompt, in some embodiments, or as two or more separate prompts, if desired. Thus, it can be appreciated that the prompt data 212 that corresponds to the prompts illustrated and described herein with reference to operations 304 and 310 can be combined in some embodiments. It should be understood that this embodiment is illustrative, and should not be construed as being limiting in any way.

If the video doorbell unit 112 determines, in operation 308, that the doorbell button 208 has been pressed within the time limit, the method 300 can proceed to operation 312. At operation 312, the video doorbell unit 112 can generate a standby prompt. The standby prompt can instruct a user or other entity that the video doorbell unit is attempting to establish a connection with the access point, gateway, controller, or other device such as, for example, the security system controller 102.

According to some embodiments, the prompt generated in operation 312 can include a prompt that corresponds to a phrase "attempting to establish connection with access point [or gateway, or controller, etc.]," a word "standby," combinations thereof, or the like. As explained above, the prompt generated in operation 312 can be generated based on prompt data 212 stored at the video doorbell unit 112 and therefore may not require any communications with other entities, network communications, or the like. Because other prompts can be generated to prompt the user or other entity to activate the access point and to press the doorbell button 208, it should be understood that this embodiment is illustrative, and should not be construed as being limiting in any way.

From operation 312, the method 300 can proceed to operation 314. At operation 314, the video doorbell unit 112 can determine if a connection with an access point or other device has been established. According to various embodiments, the video doorbell unit 112 can determine, in operation 314, if a connection with any other device is detected; if a connection with a specified device is detected; or the like. According to various embodiments, the video doorbell unit 112 can make the determination of operation 314 by determining if the transceiver 224 associated with the video doorbell unit 112 has sent or received any data from an external device. In some other embodiments, the video doorbell unit 112 can determine if communication of a packet or other type of data has been successfully sent or received. Because the video doorbell unit 112 can detect communications and/or successful setup of a connection in additional and/or alternative manners, it should be understood that these examples are illustrative, and should not be construed as being limiting in any way.

If the video doorbell unit 112 determines, in operation 314, that the connection with an access point has not been established, the method 300 can proceed to operation 310. As explained above, the video doorbell unit 112 can generate a failure prompt and return to operation 304. Thus, it can be appreciated that operations 304-314 can be iterated by the video doorbell unit 112 until the video doorbell unit 112 determines, in any iteration of operation 314, that a connection with an access point has been established. If the video doorbell unit 112 determines, in any iteration of operation 314, that a connection with the access point has been established, the method 300 can proceed to operation 316.

At operation 316, the video doorbell unit 112 can generate a verification prompt to inform a user or other entity that a connection with another device (e.g., an access point, a gateway, a router, a controller, or other device) has been established. It should be understood that the prompt generated in operation 316 may not identify the device with which the connection has been established. Rather, the prompt generated in operation 316 can merely inform the user or other entity that a connection has been established and a separate verification of the device with which the connection has been established can be completed by the user as will be illustrated and described below.

According to some embodiments, the prompt generated in operation 316 can include a prompt that corresponds to a spoken phrase "connection established with access point [or gateway, or router, or controller such as the security system controller 102]," "connection established," other prompts and/or sounds, combinations thereof, or the like. According to various embodiments, the prompt generated in operation 316 also can prompt a user or other entity to verify that the device with which the connection has been established is the correct entity. Thus, the prompt generated in operation 316 (or subsequent operation that is not illustrated in FIGS. 3A-3B) can include a prompt that corresponds to a phrase such as "connection established with access point SSID SmithAlarmSystem02 [for example], please press doorbell button once to verify this connection and twice to cancel this connection," or the like. As explained above, the prompt generated in operation 316 can be generated based on prompt data 212 stored at the video doorbell unit 112 and therefore may not require any communications with other entities, network communications, or the like. Because other prompts can be generated to inform the user or other entity that the connection has been established and/or to verify the connection established, it should be understood that this embodiment is illustrative, and should not be construed as being limiting in any way.

From operation 316, the method 300 can proceed to operation 318. At operation 318, the video doorbell unit 112 can determine if the connection has been verified. In some embodiments, operation 318 can include prompting the user or other entity to verify the connection, while in other embodiments this prompt can be combined with the prompt generated in operation 316 as explained above. Regardless of when or how the user or other entity is prompted to verify the connection, operation 318 can include the video doorbell unit determining if the connection has been verified or not verified (e.g., cancelled).

If the video doorbell unit 112 determines, in operation 318, that the connection with the access point, gateway, router, controller, or other device (e.g., the security system controller 102) should not be verified, the method 300 can proceed to operation 320. At operation 320, the video doorbell unit 112 can generate a reset prompt to prompt the user or other entity to reset the video doorbell unit 112. In some embodiments, the prompt generated in operation 320 can include, for example, a spoken prompt that includes a phrase such as "hold the doorbell button for five seconds to reset the doorbell unit," "press the doorbell button for five seconds to restart the setup process," combinations thereof, or the like. Of course, the five seconds time period is illustrative and therefore should not be construed as being limiting in any way.

From operation 320, the method 300 can proceed to operation 322. At operation 322, the video doorbell unit 112 can determine if a reset has been detected. For example, the video doorbell unit 112 can determine if the doorbell button 208 has been pressed for five seconds, ten seconds, or some other time period, which can be specified by hardware logic, software logic, preferences, settings, combinations thereof, or the like. If the video doorbell unit 112 determines, in operation 322, that the reset has not been detected, the method 300 can return to operation 320, and the video doorbell unit 112 can again prompt the user to perform a reset operation such as holding the doorbell button 208 for a set period of time as explained above. Operations 320-322 can be repeated until the video doorbell unit 112 determines, in any iteration of operation 322, that the reset has been detected. If the video doorbell unit 112 determines, in any iteration of operation 322, that the reset has been detected, the method 300 can proceed to operation 324.

At operation 324, the video doorbell unit 112 can return the video doorbell unit 112 to default settings. Thus, the video doorbell unit 112 can delete any information generated or obtained during the attempted setup process (e.g., network connection information, account information, combinations thereof, or the like). The video doorbell unit 112 also can be returned to its default settings so that a next power up process can prompt the video doorbell unit 112 to initiate a setup process. It should be understood that this example is illustrative, and should not be construed as being limiting in any way. From operation 324, the method 300 can return to operation 302. Thus, it can be appreciated that if the reset is detected in operation 322, the setup process can be restarted. Because the method 300 can end instead, it should be understood that this example is illustrative, and should not be construed as being limiting in any way.

If the video doorbell unit 112 determines, in operation 318 (or any iteration thereof) that the connection should be verified, the method 300 can proceed to operation 326 (shown in FIG. 3B). In operation 326, the video doorbell unit 112 can generate a standby for testing prompt that can inform a user or other entity that the connection established and verified as illustrated and described above, is being tested. In some embodiments, the prompt generated in operation 318 can correspond to a phrase such as "please wait while the connection is tested," "connection being tested, please standby," "standby for connection test," other prompts, or the like. As explained above, the prompt generated in operation 326 can be generated based on prompt data 212 stored at the video doorbell unit 112 and therefore may not require any communications with other entities, network communications, or the like. Because other prompts can be generated to inform the user or other entity that the connection is being tested, it should be understood that this embodiment is illustrative, and should not be construed as being limiting in any way.

From operation 326, the method 300 can proceed to operation 328. At operation 328, the video doorbell unit 112 can perform a signal test on the connection. In some embodiments, the signal test can determine if the connection established with the access point, gateway, router, controller, and/or other entity (e.g., the security system controller 102) has adequate signal strength for normal operation (which can be based on a signal strength threshold, or the like). The signal test can also be tested for propagation, delay, and the like, to ensure that the connection is capable of enabling proper functioning of the video doorbell unit 112.

From operation 328, the method 300 can proceed to operation 330. At operation 330, the video doorbell unit 112 can determine if the test performed in operation 328 should be (or has been) passed. According to various embodiments, the signal test performed in operation 328 can be passed or failed based on the outcome of the signal test. Thus, for example, if the signal test specifies a signal strength threshold, a delay threshold, a propagation threshold, or the like, the test can be passed, for example, by a signal strength of a signal received by the video doorbell unit 112 (or a signal that is received from the access point or other entity with which the video doorbell unit 112 communicates) meeting the defined strength, delay, and propagation thresholds, for example. Because the signal test can be completed in additional and/or alternative manners, it should be understood that these examples are illustrative and should not be construed as being limiting in any way.

If the video doorbell unit 112 determines, in operation 330, that the test performed in operation 328 should not be passed, the method 300 can proceed to operation 332. At operation 332, the video doorbell unit 112 can generate a failure prompt and a remedy prompt. The failure prompt can inform a user or other entity that the test has failed and therefore can include a prompt such as, for example, a phrase such as "signal test has failed," "test failed," "failed," or the like. The remedy prompt can inform a user or other entity of some remedial action that can be taken. In some embodiments, the remedy prompt can include, for example, a prompt for the user to install a repeater, a prompt for the user to move the video doorbell unit 112 to a location that is closer to the access point, a prompt for the user to move the access point, or the like. Because other remedial action can be prompted by the video doorbell unit 112, it should be understood that these examples are illustrative, and should not be construed as being limiting in any way. In some embodiments, the prompts generated in operation 332 can be presented as one continuous prompt, if desired. It should be understood that this example also is illustrative, and therefore should not be construed as being limiting in any way.

As explained above, the prompt(s) generated in operation 332 can be generated based on prompt data 212 stored at the video doorbell unit 112 and therefore may not require any communications with other entities, network communications, or the like. Because other prompts can be generated to inform a user or other entity of the test failure and/or to prompt remedial action, it should be understood that this embodiment is illustrative, and should not be construed as being limiting in any way.

If the video doorbell unit 112 determines, in operation 330, that the test performed in operation 328 should be (or has been) passed, the method 300 can proceed to operation 334. At operation 334, the video doorbell unit 112 can generate a pass prompt and a button press to end prompt. The pass prompt can inform the user or other entity that the signal test has been successfully completed and the button press to end prompt can instruct a user to press the doorbell button 208 to end the setup process. As explained above, the prompts generated in operation 334 can be generated based on prompt data 212 stored at the video doorbell unit 112 and therefore may not require any communications with other entities, network communications, or the like. Because other prompts can be generated to inform the user or other entity that the test has successfully completed and to instruct a user to press the doorbell button 208 to end the setup process, it should be understood that the above examples are illustrative, and should not be construed as being limiting in any way.

From operation 334, the method 300 can proceed to operation 336. At operation 336, the video doorbell unit 112 can determine if the doorbell button 208 has been pressed after issuing the prompts in operation 334. If the video doorbell unit 112 determines that the doorbell button 208 has not been pressed after the issuance of the prompts in operation 334, the method 300 can return to operation 334, and the video doorbell unit 112 can again generate the prompts illustrated and described above with reference to operation 334. If the video doorbell unit 112 determines, in any iteration of operation 336, that the doorbell button 208 has been pressed after issuing the prompts in operation 334, the method 300 can proceed to operation 338. The method 300 also can proceed to operation 338 from operation 332 after generating the fail prompt and/or remedy prompt.

At operation 338, the video doorbell unit 112 can disable the connection and end the setup. The connection may not be used again until the doorbell button 208 is later activated, in which case a doorbell tone or the like may be generated (if the setup process has been completed successfully) or the setup process may be repeated (if the method 300 proceeded to operation 338 from operation 332). From operation 338, the method 300 can proceed to operation 340. The method 300 can end at operation 340.

According to various embodiments of the concepts and technologies disclosed herein, the audio output 116 generated by the video doorbell unit 112 and, in particular, the various prompts illustrated and described herein, can be generated by the video doorbell unit 112 based on the prompt data 212. Thus, according to various embodiments of the concepts and technologies disclosed herein, the audio output 116, and particularly the prompts illustrated and described herein, are not generated by the security system controller 102 or other devices such as gateways, routers, or the like. As such, the concepts and technologies disclosed herein can eliminate the need for resource intensive communications for transmission of audio prompts, and the like, between various entities and the video doorbell unit 112 during a setup process (though streaming audio can be enabled for normal operation of the video doorbell unit 112 to support one-way and/or two-way voice communications via the video doorbell unit 112). It should be understood that this example is illustrative, and should not be construed as being limiting in any way.

As explained above, the state sensors 206 can be used by the video doorbell unit 112 to detect state. It should be understood that the state detected by the video doorbell unit 112 can correspond to external conditions as sensed at the video doorbell unit 112. These external conditions can be conditions that are not controlled or controllable by the video doorbell unit 112 (e.g., WiFi connectivity, signal strength, power connection, and the like), but can affect whether or not the video doorbell unit 112 can be installed and/or used. Thus, the detection of these states can be important during installation and embodiments of the concepts and technologies disclosed herein make the detection and use of these states possible. Other states that can be detected by the video doorbell unit 112 (and/or the various state sensors 206 thereof) can include, but are not limited to, detecting powering up, detecting powering off, detecting installation of a battery, detecting a low battery, detecting connection of a power source, detecting disconnection of a power source, detecting pressing of a pair button, detecting failure of a pairing attempt, detecting a successful pairing attempt, detecting a button (e.g., the doorbell button 208) press, detecting loss of a WiFi connection, detecting obtaining of a WiFi connection, detecting a change in a WiFi connection, detecting a power restore, detecting a power loss, detecting connections to other devices (obtaining, loss, and/or changes), detecting a reset operation, detecting a person approaching the video doorbell unit 112, detecting a person departing an area around the video doorbell unit 112, detecting a particular face (e.g., via facial recognition) of a person approaching or leaving an area associated with the video doorbell unit 112, detecting a button (e.g., the doorbell button 208) press in a particular amount of time, detecting a subsequent button (e.g., the doorbell button 208) press in less than or more than an amount of time, combinations thereof, or the like. Because other states can be detected in accordance with the concepts and technologies disclosed herein, it should be understood that these examples are illustrative, and should not be construed as being limiting in any way.

It also can be appreciated that the doorbell button 208 of the video doorbell unit 112 illustrated and described herein can support different functions based upon a state associated with the video doorbell unit 112 and/or based upon a point in a setup process that has been reached. For example, as illustrated and described herein, the doorbell button 208 can initiate the setup process, verify (or not verify) a connection with an access point, reset the video doorbell unit 112, restart the installation process, initiate a signal test, and/or end a setup process. The doorbell button 208 also can function as the doorbell button after installation. Thus, the doorbell button 208 of the video doorbell unit 112 illustrated and described herein can perform different functions based on state and/or other considerations. It should be understood that this example is illustrative, and should not be construed as being limiting in any way.

Figure 4:
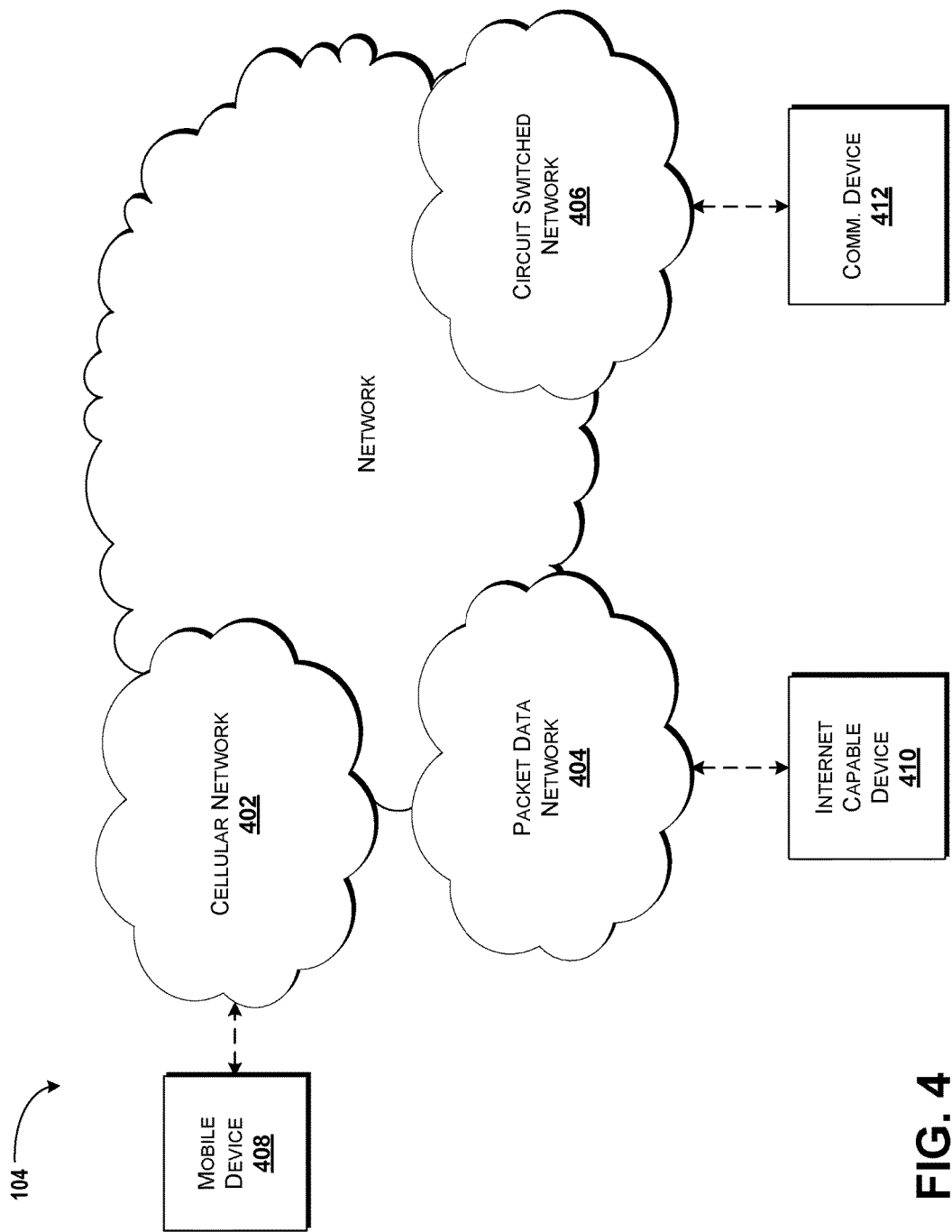
FIG. 4 schematically illustrates a network, according to an illustrative embodiment of the concepts and technologies described herein.

Turning now to FIG. 4, additional details of the network 104 are illustrated, according to an illustrative embodiment. Some embodiments of the network 114 can also include any of the features and/or components illustrated and described herein with reference to the network 104. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSDPA), and HSPA+. The cellular network 402 also is compatible with 4G mobile communications standards as well as evolved and future mobile standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
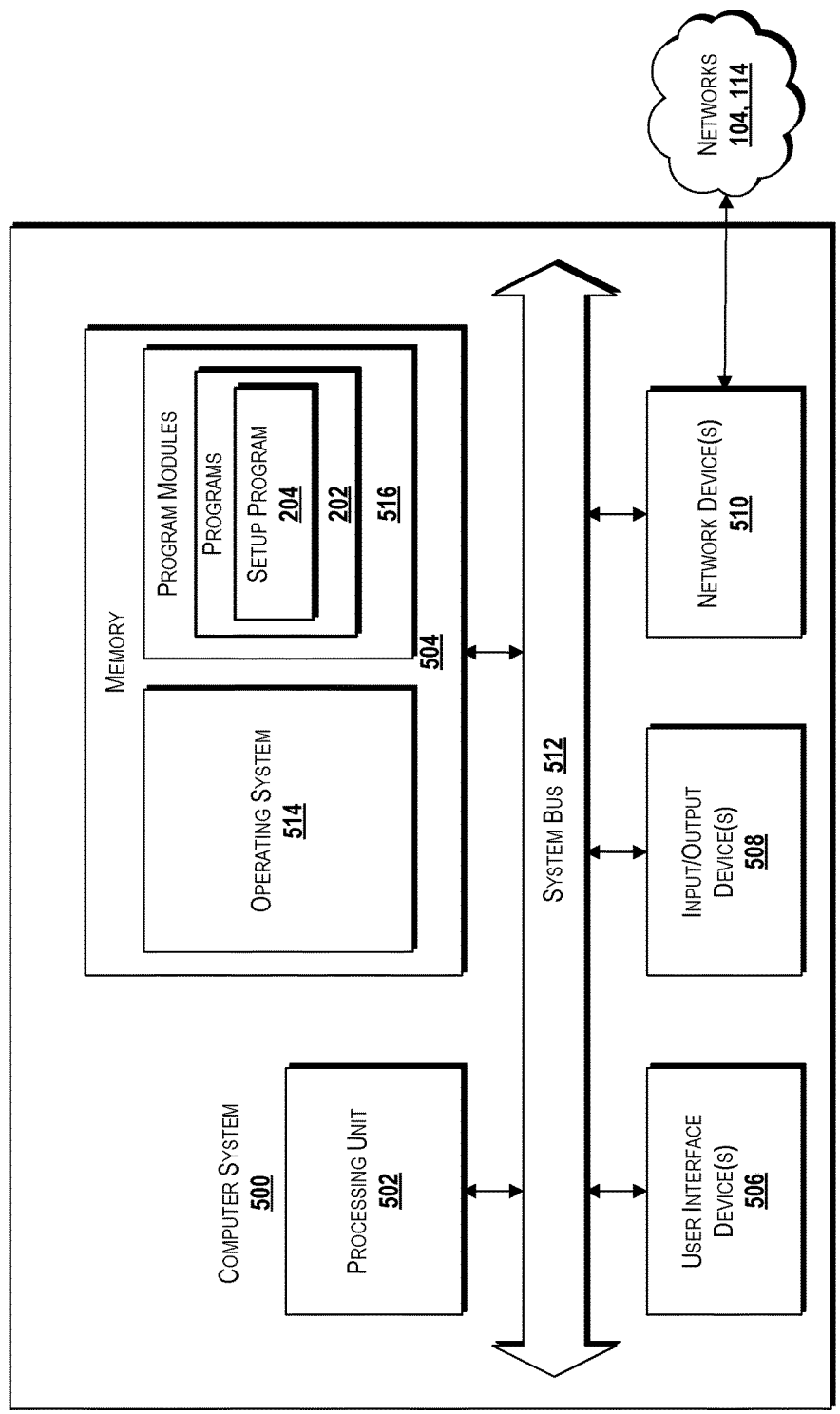
FIG. 5 is a block diagram illustrating an example computer system configured to state detection and voice guided setup for a video doorbell unit, according to some illustrative embodiments of the concepts and technologies described herein.

FIG. 5 is a block diagram illustrating a computer system 500 configured to provide the functionality described herein for state detection and voice guided setup for a video doorbell unit 112, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. It should be understood that the processing unit 502 can include the processor 205 and/or that the processor 205 can be similar or even identical to the processing unit 502, though this is not necessarily the case. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include the programs 202 and/or the setup program 204 illustrated and described with reference to FIG. 2. These and/or other programs can be embodied in computer-readable media containing instructions that, when executed by the processing unit 502, perform one or more methods or processes such as the method 300 described in detail above with respect to FIGS. 3A-3B and/or other functionality as illustrated and described herein. It can be appreciated that, at least by virtue of the instructions embodying the method 300 and/or other functionality illustrated and described herein being stored in the memory 504 and/or accessed and/or executed by the processing unit 502, the computer system 500 is a special-purpose computing system that can facilitate providing the functionality illustrated and described herein. According to embodiments, the program modules 516 may be embodied in hardware, software, firmware, or any combination thereof. Although not shown in FIG. 5, it should be understood that the memory 504 also can be configured to store the data 110, the prompt data 212, the other data 214, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for state detection and voice guided setup for a video doorbell unit have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A device comprising:
a processor; and
a memory that stores computer-executable instructions that, when executed by the processor, cause the processor to perform operations comprising
detecting a power connection at a video doorbell unit using a state sensor of the video doorbell unit, wherein detecting the power connection comprises detecting powering on of the video doorbell unit using the state sensor and determining a power source associated with the powering on,
generating, based on prompt data stored at the video doorbell unit, audio output comprising a prompt to press a doorbell button of the video doorbell unit to initiate a setup process for the video doorbell unit,
starting a timer set to a time period,
determining if the doorbell button is pressed during the time period,
if a determination is made that the doorbell button is pressed during the time period,
generating, based on the prompt data, a standby prompt that indicates that a connection with an access point is being set up,
determining that the connection with the access point has been set up,
determining if the connection with the access point is verified,
if a determination is made that the connection with the access point is verified, generating a standby for testing prompt and performing a signal test on a signal associated with the connection with the access point,
determining that the signal test has passed, and
disabling the connection and ending the setup process for the video doorbell unit, and
if a determination is made that the doorbell button is not pressed during the time period, generating, by the processor and based on the prompt data, a failure prompt that indicates that the setup process has failed.

2. The device of claim 1, wherein determining if the signal test has passed comprises:
measuring a signal strength, a delay, and a propagation associated with the signal, wherein the signal is transmitted between the video doorbell unit and the access point; and
determining that the signal strength, the delay, and the propagation meet a defined signal strength threshold, a defined delay threshold, and a defined propagation threshold.

3. The device of claim 1, wherein the computer-executable instructions, when executed by the processor, cause the processor to perform operations further comprising:
in response to determining that the signal test has passed, generating, based on the prompt data, a pass prompt and a prompt to press the doorbell button to end the signal test; and
determining that the doorbell button has been pressed.

4. The device of claim 1, wherein the prompt to press the doorbell button further comprises a prompt to activate the access point.

5. The device of claim 4, wherein the access point comprises a security system controller that is located at a monitored location, wherein the video doorbell unit is being installed at the monitored location, wherein the connection comprises a local network established between the video doorbell unit and the security system controller.

6. A method comprising:
detecting, by a processor of a video doorbell unit using a state sensor of the video doorbell unit, a power connection at the video doorbell unit, wherein detecting the power connection comprises detecting powering on of the video doorbell unit using the state sensor and determining a power source associated with the powering on;
generating, by the processor and based on prompt data stored at the video doorbell unit, audio output comprising a prompt to press a doorbell button of the video doorbell unit to initiate a setup process for the video doorbell unit;
starting, by the processor, a timer set to a time period;
determining, by the processor, if the doorbell button is pressed during the time period;
if a determination is made that the doorbell button is pressed during the time period,
generating, by the processor and based on the prompt data, a standby prompt that indicates that a connection with an access point is being set up,
determining, by the processor, that the connection with the access point has been set up,
determining, by the processor, if the connection with the access point is verified,
if a determination is made that the connection with the access point is verified, generating a standby for testing prompt and performing a signal test on a signal associated with the connection with the access point,
determining, by the processor, that the signal test has passed, and
disabling, by the processor, the connection and ending the setup process for the video doorbell unit; and
if a determination is made that the doorbell button is not pressed during the time period, generating, by the processor and based on the prompt data, a failure prompt that indicates that the setup process has failed.

7. The method of claim 6, wherein determining if the signal test has passed comprises:
measuring a signal strength, a delay, and a propagation associated with the signal, wherein the signal is transmitted between the video doorbell unit and the access point; and
determining that the signal strength, the delay, and the propagation meet a defined signal strength threshold, a defined delay threshold, and a defined propagation threshold.

8. The method of claim 6, further comprising:
in response to determining that the signal test has passed, generating, by the processor and based on the prompt data, a pass prompt and a prompt to press the doorbell button to end the signal test; and
determining, by the processor, that the doorbell button has been pressed.

9. The method of claim 6, further comprising:
in response to a determination that the connection with the access point is not verified, resetting the video doorbell unit and returning the video doorbell unit to default settings.

10. The device of claim 1, wherein the video doorbell unit does not include a visual display.

11. The method of claim 6, wherein the prompt to press the doorbell button further comprises a prompt to activate the access point.

12. The method of claim 6, wherein the access point comprises a gateway device associated with a network provider.

13. The method of claim 6, wherein the access point comprises a security system controller.

14. The method of claim 6, wherein the access point comprises a security system controller that is located at a monitored location, wherein the video doorbell unit is being installed at the monitored location, and wherein the connection comprises a local network established between the video doorbell unit and the security system controller.

15. The method of claim 6, wherein the video doorbell unit does not include a visual display.

16. A computer storage medium having computer-executable instructions stored thereon that, when executed by a processor, cause the processor to perform operations comprising:
   detecting a power connection at a video doorbell unit using a state sensor of the video doorbell unit, wherein detecting the power connection comprises detecting powering on of the video doorbell unit using the state sensor and determining a power source associated with the powering on;
   generating, based on prompt data stored at the video doorbell unit, audio output comprising a prompt to press a doorbell button of the video doorbell unit to initiate a setup process for the video doorbell unit;
   starting a timer set to a time period;
   determining if the doorbell button is pressed during the time period;
   if a determination is made that the doorbell button is pressed during the time period,
      generating, based on the prompt data, a standby prompt that indicates that a connection with an access point is being set up,
      determining that the connection with the access point has been set up,
      determining if the connection with the access point is verified,
      if a determination is made that the connection with the access point is verified, generating a standby for testing prompt and performing a signal test on a signal associated with the connection with the access point,
      determining that the signal test has passed, and
      disabling the connection and ending the setup process for the video doorbell unit; and
   if a determination is made that the doorbell button is not pressed during the time period, generating, by the processor and based on the prompt data, a failure prompt that indicates that the setup process has failed.

17. The computer storage medium of claim 16, wherein determining if the signal test has passed comprises:
   measuring a signal strength, a delay, and a propagation associated with the signal, wherein the signal is transmitted between the video doorbell unit and the access point; and
   determining that the signal strength, the delay, and the propagation meet a defined signal strength threshold, a defined delay threshold, and a defined propagation threshold.

18. The computer storage medium of claim 16, wherein the computer-executable instructions, when executed by the processor, cause the processor to perform operations further comprising:
   in response to determining that the signal test has passed, generating, based on the prompt data, a pass prompt and a prompt to press the doorbell button to end the signal test; and
   determining that the doorbell button has been pressed.

19. The computer storage medium of claim 16, wherein the prompt to press the doorbell button further comprises a prompt to activate the access point.

20. The computer storage medium of claim 19, wherein the access point comprises a security system controller that is located at a monitored location, wherein the video doorbell unit is being installed at the monitored location, wherein the connection comprises a local network established between the video doorbell unit and the security system controller, and wherein the video doorbell unit does not include a visual display.

* * * * *